Figure 1:
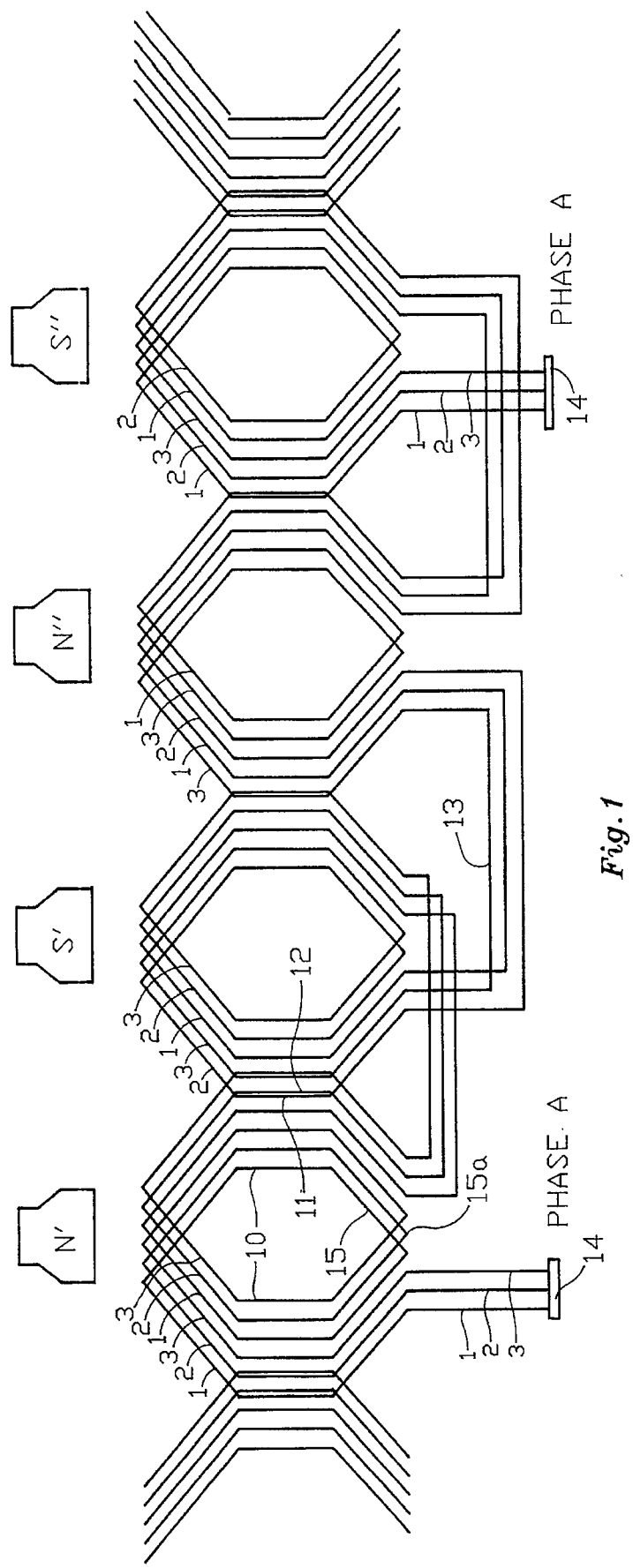

United States Patent [19]
Willyoung

[11] Patent Number: 5,654,602
[45] Date of Patent: Aug. 5, 1997

[54] GENERATOR WINDING

[76] Inventor: David M. Willyoung, 12 Harmon Rd., Scotia, N.Y. 12302

[21] Appl. No.: 645,204

[22] Filed: May 13, 1996

[51] Int. Cl.⁶ .................................. H02K 3/28; H02K 3/04
[52] U.S. Cl. ........................ 310/179; 310/198; 310/208; 310/205; 310/203; 310/207; 310/180
[58] Field of Search .................................. 310/198, 179, 310/202, 203, 206, 207, 208, 205, 180, 254

[56] References Cited

U.S. PATENT DOCUMENTS

| | | | |
|---|---|---|---|
| 2,778,962 | 1/1957 | Taylor | 310/202 |
| 2,778,963 | 1/1957 | Habermann | 310/202 |
| 3,152,273 | 10/1964 | Harrington | 310/198 |
| 3,201,627 | 8/1965 | Harrington | 310/198 |
| 3,408,517 | 10/1968 | Willyoung | 310/198 |
| 3,476,964 | 11/1969 | Willyoung | 310/198 |
| 3,652,888 | 3/1972 | Harrington | 310/198 |

*Primary Examiner*—Thomas M. Dougherty
*Assistant Examiner*—B. Mullins
*Attorney, Agent, or Firm*—William C. Crutcher

[57] ABSTRACT

A three phase four pole synchronous generator winding is shown, having three parallel connected circuits per phase, for a stator with 63 winding slots, each circuit having seven series connected coils, with particular application to very large nuclear or fossil fuel generators and with emphasis on low cost.

3 Claims, 2 Drawing Sheets

5,654,602

1

GENERATOR WINDING

BACKGROUND OF THE INVENTION

This invention relates generally to polyphase, multi-circuit dynamo electric machine winding patterns and more particularly to winding patterns for four pole, three phase, dynamo electric machine with three parallel connected circuits per phase.

A conventional turbine-driven polyphase generator of large size comprises a stationary armature element and a cooperating rotatable field element, and may be operative to generate three-phase electric power, whereby the field element, if of four-pole construction, is rotated at 1800 r.p.m. for a frequency of 60 hertz, or is rotated at 1500 r.p.m. for a frequency of 50 hertz. In the generator, the armature element or core is formed of magnetizable material .and is normally provided with an elongated cylindrical opening therethrough that is bounded by a number of angularly spaced-apart winding slots, in which a composite three-phase armature winding is carried, the armature winding including three individual phases that are frequently connected in Y or star relation to supply the load. The field element is also formed of magnetizable material and is normally of the elongated cylindrical-rotor type and carries a field winding, the field element being arranged in the armature opening and being operative upon rotation to induce phase voltages in the respective phases of the armature winding.

Ordinarily, each phase of the armature winding includes a number of phase belts each provided with a plurality of series connected coils each having two coil sides, the coil sides being distributed in the winding slots of the armature element; the armature winding is arranged in two layers so that each winding slot receives two of the coil sides respectively disposed in the top and in the bottom thereof; and each of the coil sides includes an insulating casing enclosing the conductors thereof for the purpose of electrically insulating the coil side from the contiguous coil side and from the armature element.

In directly cooled machines, each of the winding slots also accommodates facility for cooling the two contained coil sides, which cooling facility ordinarily includes a duct arrangement through which a current of air or other gas, or stream of liquid is forced; whereby each of the slots must accommodate two of the coil sides, as well as the cooling facility therefor; and each of the coil sides includes the conductors thereof and the enclosing insulating casing.

Now in the design of polyphase generators, there is an ever-increasing demand for greater power ratings; whereby the competition for space in the armature between the magnetic material thereof and the winding slots therein, and among the several elements arranged in each winding slot thereof, presents design problems of ever-increasing complexity.

In order to obtain a maximum power output from a polyphase generator structure of given physical dimensions, it has been proposed in U.S. Pat. No. 2,778,963, granted on Jan. 22, 1957 to Rudolph Habermann, Jr., that each phase of the armature winding be provided with three parallel circuits arranged in a pair of series connected sections respectively disposed in a pair of oppositely poled phase belts, wherein the coil sides of the three parallel circuits are arranged in a predetermined sequence in the slots in the phase belts in order to minimize voltage and phase unbalance among the three individual circuits of the phase mentioned.

U.S. Pat. No. 3,201,627 issued to Dean B. Harrington on Aug. 17, 1965 describes a number of winding patterns for four-pole, three-phase armature windings having three parallel-connected circuits per phase. The patterns illustrated in that patent for a 72 slot core structure give a high degree of balance among the three parallel-connected circuits, both with respect to magnitude of voltage unbalance and quadrature unbalance (phase angle displacement) between a given circuit and the phase.

Although the winding patterns disclosed in the Harrington patent are quite suitable from an electrical standpoint, in that there is only negligible increased relative heating due to the circulating currents between the three parallel-connected circuits, there are some mechanical complexities involved in use of the patterns. U.S. Pat. No. 3,476,964 issued Nov. 4, 1969 to David M. Willyoung disclosed an improved four-pole, three-phase armature winding having three parallel-connected circuits per phase, which greatly reduced the mechanical complexities of the aforesaid Harrington patent without significantly affecting the circulating currents between the three parallel-connected circuits. The increased relative heating due to such circulating currents becomes less significant when internal direct cooling of the winding is employed and it overshadowed by the higher power ratings which may be possible by improved winding patterns, especially in the case of generators used in large nuclear or fossil power generation plants.

In some generator designs, certain economies and technical benefits are achieved by reducing the number of armature slots, particularly in directly-cooled generators of very large ratings. If it is desired to reduce armature bar forces by employing multi-circuit windings, it is generally more difficult to find suitable patterns as the number of circuits increase and the number of slots decrease. To illustrate, the number of slots in a three phase winding with three parallel connected circuits per phase must be divisible by nine. For example, reducing the number of slots from the 72 slot pattern shown in the aforesaid Harrington and Willyoung patents gives the possibility of 63, 54, 45 ... etc. slots. Heretofore, efforts to reduce the number of slots without creating substantial circulating currents among the three circuits have been unsuccessful. Furthermore reducing the number of slots without reducing the number of phases or the number of parallel-connected circuits per phase gives the possibility of "fractional slot" windings, which have generally been avoided in the past.

Accordingly, one object of the present invention is to provide improved winding patterns for a three phase, four pole, three circuit dynamo electric machine with acceptably small circulating currents between circuits.

Still another object is to provide an improved three-phase, four-pole, 63 slot armature winding having three parallel-connected circuits per phase, and utilizing a fractional slot winding with suitably low electrical unbalance between circuits so that circulating currents are inconsequential.

DRAWING

Figure 2:
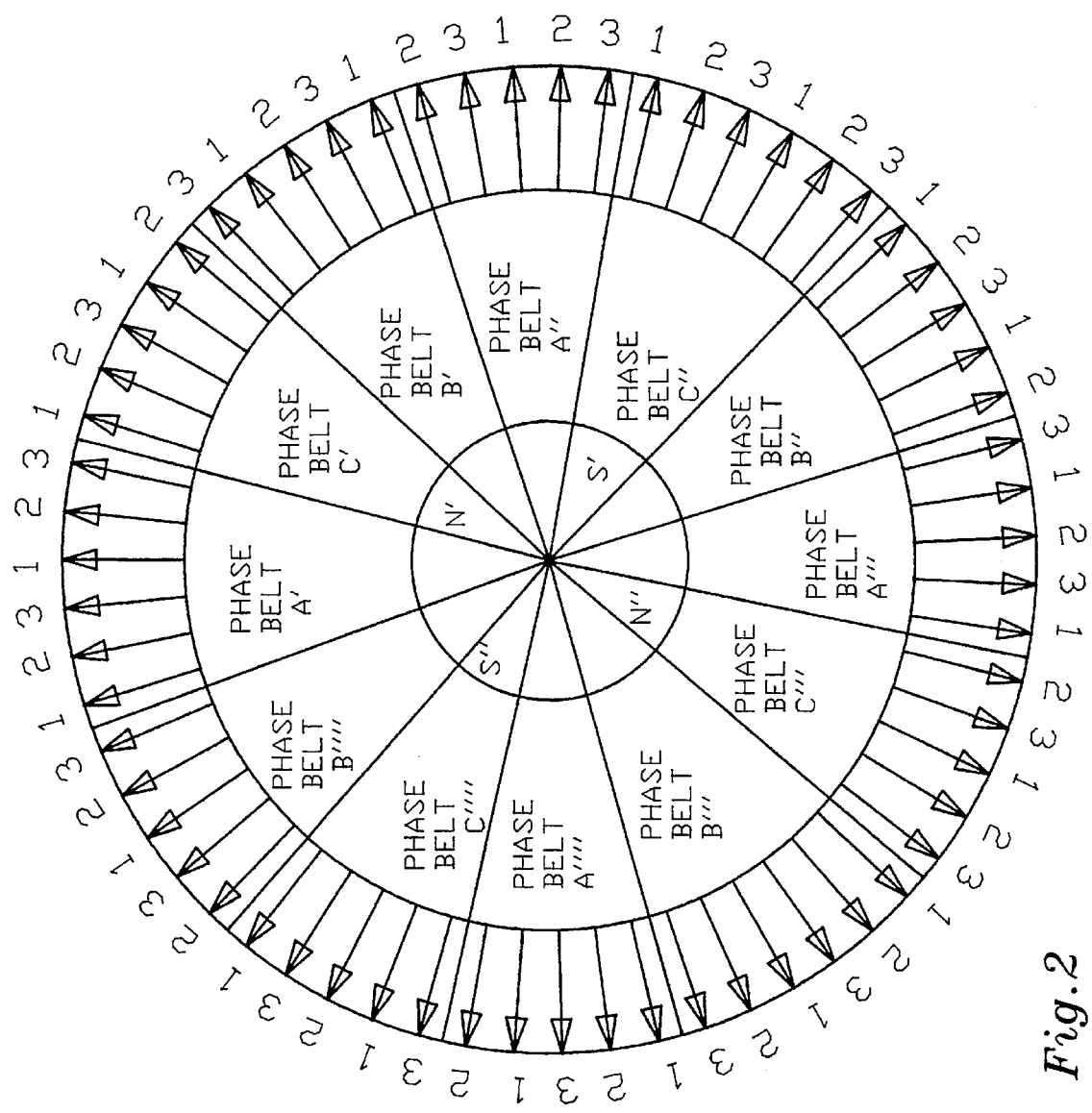

The invention, both as to organization and method of practice, together with further objects and advantages thereof, will best be understood by reference to the following specification, taken in connection with the accompanying drawings, in which:

FIG. 1 is a diagrammatic illustration of a dynamo electric machine armature winding embodying the invention, the winding being for a four-pole, three-phase, 63 slot construction and having three parallel-connected circuits per phase, only one phase of the three-phase winding being illustrated, and FIG. 2 is a combined schematic diagram of the phase belt arrangement in the winding and a vectorial diagram of phase voltage components for all three circuits of all three phases.

SUMMARY OF THE INVENTION

Briefly stated, the invention is practiced by providing a dynamo electric machine comprising a three phase, four pole winding disposed in a core having sixty three uniformly spaced winding slots, each phase of said winding having three parallel connected circuits per phase, each circuit of said winding having seven series connected coils per circuit. Preferably, the circuits are arranged throughout the winding in circuit sequence 1, 2, 3, 1, 2, 3 - - -.

DESCRIPTION

Referring to FIG. 1 of the drawing, there is shown a developed view of a stationary armature winding for disposition in the slots of a laminated core structure (not shown). A rotary field element represented by the poles indicated at N', S', N", S" induces voltages in the slot portions 10 of the winding.

In FIG. 1, only one phase of the winding is illustrated, it being understood by those skilled in the art that the remaining phases B and C are identical but displaced 120 mechanical degrees in the generator core structure. Also FIG. 1 is illustrated as a chorded winding with a coil pitch of 12/16 (or 0.75), it being understood by those skilled in the art that such windings are generally chorded, such that top coil sides such as 11 will overlap bottom coil sides such as 12 in the two layer winding. The coil pitch may be selected to provide optimum performance as more fully described in the aforesaid Harrington and Willyoung patents.

FIG. 2, on the other hand, is drawn to specifically illustrate all three phases as well as to illustrate the winding as specifically applied to a 63 slot core structure.

Referring back to FIG. 1 of the drawing, the two positive phase belts are indicated as A', A''', while the negative phase belts for A phase are illustrated as A", A"". The phase belts also indicate the top layer coil sides which overlap the bottom layer coil sides in actuality, in accordance with the selected pitch.

There are three parallel-connected circuits in phase A (as well as in the other phases which are not shown in FIG. 1). These are arbitrarily designated as circuits 1, 2 and 3, although any designation could be employed and it will be understood that the numbers can be interchanged without changing the electrical pattern and that the letters or numbers used to designate and to differentiate between the circuits do not limit the scope of the invention.

Circuit "1" indicated by reference numeral 1, circuit "2" by reference numeral 2 and circuit "3" by reference numeral 3. Pole-to-pole jumpers, such as 13 are employed to connect elements of the same circuit in two adjacent phase belts. Connection rings 14 serve to provide a connection from circuits 1, 2 and 3 to the machine terminals.

It will be apparent from FIG. 1 that the circuits 1, 2 and 3 are arranged in a symmetrical circuit sequence 1, 2, 3, 1, 2, 3 - - - throughout all 63 slots. This is evident from FIG. 2 as well, which is a vectorial diagram of phase voltage components for all three circuits of all three phases.

It will further be evident from FIG. 1, that each of the circuits 1, 2 and 3 consists of seven series-connected coils, each coil comprising a top coil side 11 and a bottom coil side 12, together with the associated end windings on opposite ends of the generator stator. The end windings, one of which is indicated at 15, are circumferential extensions of either a top coil side 11 or a bottom coil side 12, connected by a series loop such as 15a.

Referring to FIG. 2 of the drawing, it is seen that there are two diametrically opposed positive phase belts A' and A''', and two diametrically opposed negative phase belts A" and A"". Similarly there are two opposed positive phase belts for phase B indicated by B' and B''' and two negative phase belts for B" and B"". The winding shown in FIG. 2 extends over 360 mechanical degrees and 720 electrical degrees as is well-known in the art.

Since there are 21 coils in each phase to be equally spaced around the stator circumference, and since 360 divided by 21 is not an integer, this is known as a "factional slot" winding. Fractional slot windings have generally been avoided in the past, because of the difficulty in achieving symmetrical winding patterns and in balancing the circuits in multi-circuit windings to reduce circulating currents between parallel-connected circuits in a multi-circuit winding.

In the arrangement according to the present invention, an improved winding is achieved by arranging consecutive phase belts to contain five coils in three of the phase belts and six coils in the remaining phase belt. Reference to FIG. 2 of the drawing shows that phase belt A' contains six coil sides arranged in circuit sequence 1, 2, 3, 1, 2, 3; phase belt A" contains five coil sides arranged in circuit sequence 2, 3, 1, 2, 3; phase belt A''' contains five coil sides arranged in circuit sequence 3, 1, 2, 3, 1; and lastly phase belt A"" contains five coil sides arranged in circuit sequence 1, 2, 3, 1, 2.

Reference to FIG. 2 illustrates that phase B and phase C are similarly laid out 120° apart in a similar arrangement having six, five, five, and five coils in the respective phase belts.

The arrangement and distribution of circuits 1, 2 and 3 and the four phase belts A', A", A''' and A"" in terms of both the occurrences and the positions thereof in the winding slots are summarized in Table 1 below. The mechanical and electrical slot angle is 5.7143°. This being a non-integer, resulting in a "fractional slot" winding, there are either six or five slot positions corresponding to a phase belt as indicated by Table 1.

TABLE 1

| | Phase A | | | | | |
|---|---|---|---|---|---|---|
| Slot Position | 1 | 2 | 3 | 4 | 5 | 6 |
| N' | 1 | 2 | 3 | 1 | 2 | 3 |
| S' | 2 | 3 | 1 | 2 | 3 | — |
| N" | 3 | 1 | 2 | 3 | 1 | — |
| S" | 1 | 2 | 3 | 1 | 2 | — |

Accordingly, circuit 1 appears twice in a first slot position, once in a second slot position, once in a third slot position, twice in a fourth slot position and once in a fifth slot position and not at all in a sixth slot position.

Circuit 2 appears once in a first slot position, twice in a second slot position, once in a third slot position, once in a fourth slot position, twice in a fifth slot position and not at all in a sixth slot position.

Circuit 3 appears once in a first slot position, once in a second slot position, twice in a third slot position, once in a fourth slot position, once in a fifth slot position, and once in a sixth slot position.

As a matter of convenience, this relationship is set forth in Table 2 appearing below.

TABLE 2

| Slot Position | Phase A | | | | | |
|---|---|---|---|---|---|---|
| | 1 | 2 | 3 | 4 | 5 | 6 |
| Circuit 1 | XX | X | X | XX | X | — |
| Circuit 2 | X | XX | X | X | XX | — |
| Circuit 3 | X | X | XX | X | X | X |

Each circuit appears twenty-one times for each of the three circuits listed in Table 2 and the voltages are in perfect balance. Unlike earlier "multiple circuit windings", with "fractional slots per pole per phase", positioning of the coil side conductors is not the vital and germinal requirement of the windings of the present invention. This is because the electrical flux is not constrained to a physical phase belt, but instead will find the path of least resistance, (least reluctance). Thus machines of this invention represent a new class of armature windings which achieve perfect balance by their inherent nature.

The 63 slot winding disclosed in the present invention is particularly useful in delivering electric power from a power system taking nuclear or fossil-fired power from a large nuclear reactor. In any of these modes of operation, the power flows are expected to be very large. The disclosed 63 slot, fractional-slot per pole winding allows seven slots per circuit per phase and achieves this without unbalance between circuits.

While there has been disclosed what is considered to be the preferred embodiment of the invention, other modifications may occur to those skilled in the art, and it is desired to secure in the appended claims all such modifications as fall within the true spirit and scope of the invention.

I claim:

1. A dynamo electric machine comprising a three phase, four pole winding disposed in a core having sixty three uniformly spaced winding slots, each phase of said winding having three parallel connected circuits per phase, each circuit of said winding having seven series connected coils per circuit, the circuits being arranged throughout the winding in circuit sequence 1, 2, 3, 1, 2, 3, 1, 2, 3 - - -.

2. The winding according to claim 1, wherein each phase is arranged in four circumferentially spaced phase belts, one phase belt having six top coil sides therein and each of the other three phase belts having five top coil sides therein.

3. The combination according to claim 2, wherein the circuit sequence in the first phase belt is 1, 2, 3, 1, 2, 3; the circuit sequence in the next circumferentially displaced phase belt is 2, 3, 1, 2, 3; the circuit sequence in the next circumferentially space phase belt is 3, 1, 2, 3, 1; and the circuit sequence in the next circumferentially spaced phase belt is 1, 2, 3, 1, 2.

* * * * *